United States Patent [19]

Oaks

[11] Patent Number: 4,752,993

[45] Date of Patent: Jun. 28, 1988

[54] FASTENER AND METHOD OF ATTACHMENT TO SHEET MATERIAL

[76] Inventor: Daniel V. Oaks, 2734 Ronald, Troy, Mich. 48098

[21] Appl. No.: 932,406

[22] Filed: Nov. 19, 1986

Related U.S. Application Data

[63] Continuation-in-part of Ser. No. 757,338, Jul. 22, 1985, abandoned, which is a continuation-in-part of Ser. No. 714,998, Mar. 22, 1985, abandoned.

[51] Int. Cl.⁴ ............................................. B23P 19/00
[52] U.S. Cl. .................................... 29/21.1; 29/432.1; 29/521; 29/522 R; 29/525; 411/103; 411/177
[58] Field of Search .................. 29/21.1, 34 R, 432.1, 29/432, 505, 521, 522 R, 525; 411/103, 166, 176, 177, 179, 180, 181, 183, 184, 427

[56] References Cited

U.S. PATENT DOCUMENTS

| | | | |
|---|---|---|---|
| 2,385,851 | 10/1945 | Swanstrom | 411/103 |
| 2,948,316 | 8/1960 | Siag et al. | 411/103 |
| 3,704,507 | 12/1972 | Grube | 29/417 |
| 3,829,957 | 8/1974 | Pouch et al. | 29/445 |
| 3,878,598 | 4/1975 | Steward | 29/432.2 |
| 3,926,236 | 12/1975 | Pouch et al. | 151/41.73 |
| 4,658,502 | 4/1987 | Echold et al. | 29/798 |

FOREIGN PATENT DOCUMENTS

| | | | |
|---|---|---|---|
| 1436526 | 6/1965 | France. | |
| 1274352 | 5/1972 | United Kingdom | 411/177 |
| 506317 | 3/1976 | U.S.S.R. | 151/41.73 |

*Primary Examiner*—Timothy V. Eley
*Attorney, Agent, or Firm*—Remy J. VanOphem

[57] ABSTRACT

A fastener and method of attachment of such fastener to sheet material to provide attachment of a tubular fastener to the sheet material by extruding, without severing, portions of the sheet material completely through openings on the base portion of the fastener. In one embodiment of the invention, the extruded material is clinched on the top surface of the base portion by clinch members integrally formed with the base portion. The fastener is internally threaded, lightweight and preferably heat-treated prior to attachment to the sheet material to provide fastener strength equivalent to or greater than that of much heavier nuts. Two types of such fasteners may be attached by a method which opens up a hole in the sheet material of a larger diameter than the major diameter of the threads in the fasteners while simultaneously clinching the fastener in place. This eliminates the need to use thread-cutting bolts. The fasteners may be connected together to form a strip to be fed into an automated assembly unit from a dispenser. In another embodiment of the invention, the extruded material is clinched on the top surface by extruding it through clinch openings into the cavities of a die member that is brought into contact with the top surface of the fastener, each such cavity being aligned with and being somewhat larger than the clinch opening of the fastener that it is adjacent to.

17 Claims, 4 Drawing Sheets

1

FASTENER AND METHOD OF ATTACHMENT TO SHEET MATERIAL

CROSS-REFERENCE TO RELATED APPLICATIONS

This application is a continuation-in-part application of my prior application Ser. No. 757,338 now abandoned which, in turn, was a continuation-in-part application of my prior application Ser. No. 714,998 now abandoned filed on Mar. 22, 1985, now abandoned.

BACKGROUND OF THE INVENTION

1. Field of the Invention

This invention relates to fasteners and, in particular, to tubular fasteners and methods of attachment to sheet metal panels and certain copolymer and plastic panels.

2. Description of the Prior Art

In the manufacture of automotive products it is often necessary to join component parts, one of which is a panel, to one another by the use of threaded fasteners. Bolts or screws are commonly threaded into suitable nuts secured to the panel. The prior art in methods of attachment encompass various types of fasteners including nuts, clinch nuts and pierce clinch nuts. They are attached by welding or by a variety of mechanically clinched, extruded, or swaged techniques whereby the nut body or a portion thereof, cooperating with a die member, effects an attachment.

Clinch nuts are most commonly attached to sheet material by one of two methods. In the first method the nuts are punched through the sheet material, clinching the nut around the periphery of the hole punched out by the nut. Using this method of attachment reduces the load bearing surface area of the nut abutting against the sheet material. When power tools are used to insert a bolt or screw into the attached nut, there is a tendency to dislodge the nut from the panel because of the low push-off strength of these fasteners.

In the second method, the nuts are clinched onto the surface of the sheet material while simultaneously having a punch in the bore of the nut punch out a slug in the sheet material. This method of attachment offers an increased area of load bearing surface abutting against the sheet material. It also necessitates the use of a thread cutting bolt with the fastener, because the diameter of the punch in the bore of the nut cannot be larger than the minor diameter of the threaded bore. The use of thread cutting bolts is shown by the U.S. Pat. Nos. to Pouch et al, U.S. Pat. Nos. 3,829,957 and 3,926,236, and Russian Pat. No. 506,317. The use of thread-cutting bolts, however, reduces the performance of the nut because of the relatively low push-off strength it exhibits. Also, the use of such bolts is more costly and it is more difficult to control tolerances of the fastener.

In either method, the nuts are relatively heavy, making their use undesirable in automotive assembly where there has been an effort to reduce weight to increase fuel economy. With the quest for lighter weight vehicles, thinner sheet panels are being used. Inadequate pull-through strength has been cited as a weakness of clinch and pierce and clinch type fasteners.

The prior art patents of Schleicher, U.S. Pat. No. 3,900,937; Marquis, U.S. Pat. No. 4,059,897; Williams, U.S. Pat. No. 2,254,558; Double, U.S. Pat. No. 3,299,500; Double et al, U.S. Pat. No. 3,315,345; Grube, U.S. Pat. No. 3,704,507; and Steward, U.S. Pat. No. 3,878,598 all teach methods of attachment wherein first a panel of material is severed by punching, shearing, or lancing and then a nut body is deformed. However, any fastener attachment which causes the panel material to be severed increases the potential for seepage of corrosive liquids through the severed panel.

Barrel-type, clip-on fasteners have been used as a lightweight, low-cost alternative to clinch nuts. The present clip-on method for mounting these fasteners, however, restricts their application to holes near the edge of the sheet material. Furthermore, the clip-on mounting method does not provide as secure a mount as the clinch nuts.

SUMMARY OF THE PRESENT INVENTION

An object of the present invention is to provide a lightweight fastener which is equal in strength to current fasteners and which lends itself to a simple fastening operation for securing it to sheet metal panels and certain co-polymers and plastic panels.

Another object of the present invention is to provide a nut-type fastener which is adapted for assembly to sheet panels of varying thicknesses without the need of prior panel preparation (i.e. pre-drilled or punched holes, clips or formed tabs etc.).

Still another object of the present invention is to provide a fastening method which does not rely upon moving tool members to sever, lance or deform the fastener to effect an attachment.

In carrying out the above objects and other objects of the invention, according to a first embodiment of the invention, there is provided a fastener for attachment to sheet material, such fastener having a base portion with top and bottom surfaces, the bottom surface being adapted to abut against the sheet material. The base portion includes a pair of spaced clinch members integrally formed with the base portion. Each of the clinch members is displaced from the rest of the base portion to define a clinch opening in the bottom surface of the rest of the base portion and an extrusion opening in the top surface thereof in fluid communication with its clinch opening. The fastener further includes a tubular attachment portion integrally formed with the base portion between the clinch members and adapted for attachment to a separate fastener. The clinch and extrusion openings permit portions of the sheet material to be extruded through the openings, the clinch members clinching the extruded sheet material to the base portion at the top surface of the base portion.

Further in carrying out the above objects and other objects of the present invention, a method for attaching such a fastener according to the first embodiment of the invention to sheet material includes the steps of placing the fastener on the sheet material so that the bottom surface of the base portion abuts the sheet material, and punching out a slug of sheet material to leave a hole in the sheet material, the hole having its center on a line forming a vertical axis of the tubular attachment portion. The method also includes the step of extruding portions of the sheet material surrounding the hole into the clinch openings and through the openings substantially simultaneously with the step of punching to effect an attachment of the fastener to the sheet material at the top surface of the base portion without severing the portions of sheet material.

In a preferred version of the fastener according to the first embodiment of the invention, the fastener is provided with a neck region and a tubular portion which has a smaller diameter than the neck region and which is separated from the neck region by an annular taper region. The fastener is attached to sheet material by placing the sheet material and the fastener in a die and compressing the die. As the die is compressed a punch in the bore of the tubular portion punches out a slug of sheet material. The sheet material is then pressed or flanged upwardly by the die against the surface of the neck region while portions of the sheet material are simultaneously extruded through the clinch members without severing the portions of sheet material surrounding the hole.

One result of this method of attachment is to create a seal between the surface of the neck region and the sheet material to which the fastener is attached. The seal is important in the area of corrosion protection by preventing liquid seepage.

This method also creates a bolt hole in the sheet material which is larger in diameter than the major diameter of a threaded region of the tubular portion, making use of thread-cutting bolts with the fastener unnecessary.

The fastener may be heat treated to increase its strength. The relatively large load bearing area of its base also serves to increase its strength in use.

To facilitate its use in automated assembly, the fastener may be connected with other fasteners in a strip. This allows the fasteners to be fed into an automated assembly unit from a dispenser, such as a spool feeder.

In carrying out the objects and other objects of the invention according to a second and preferred embodiment of the invention, there is provided a fastener for attachment to sheet material, such fastener having a base portion with top and bottom surfaces, the bottom surface being adapted to abut against the sheet material. The base portion includes a pair of clinch openings through which the sheet material can be extruded into a cavity in a die that is brought to bear against the top surface of the fastener, the cavity being somewhat larger than the clinch opening, to thereby permit the sheet material to be extruded into the cavity of the die by the operation of a die tool that is brought to bear against the bottom of the sheet material and to thereby interlock the fastener to the sheet material.

In a preferred version of the fastener according to the second embodiment of the invention, the fastener is provided with an internallythreaded tubular portion which is directly connected with the base portion by an annular taper region, which annular taper region tapers outwardly as it extends from the tubular portion to the base portion. The fastener is attached to sheet material by placing the sheet material and the fastener in a die and compressing the die. As the die is compressed a punch in the bore of the tubular portion punches out a slug of sheet material. The sheet material is then pressed or flanged upwardly by the die against the surface of the taper region while portions of the sheet material are simultaneously extruded through the clinch openings without severing the portions of sheet material surrounding the hole.

One result of this method of attachment is to create a seal between the surface of the neck region and the sheet material to which the fastener is attached. The seal is important in the area of corrosion protection by preventing liquid seepage. This method of attachment also reinforces the taper region of the fastener, thereby increasing the strength of the fastener to compression loads applied parallel to the longitudinal axis of the tubular portion.

This method also creates a bolt hole in the sheet material which is larger in diameter than the major diameter of a threaded region of the tubular portion, making use of thread-cutting bolts with the fastener unnecessary.

The fastener may also be heat treated to increase its strength. The relatively large load bearing area of its base also serves to increase its strength in use.

To facilitate its use in automated assembly, the fastener may also be connected with other fasteners in a strip. This allows the fasteners to be fed into an automated assembly unit from a dispenser, such as a spool feeder.

For a further understanding of the present invention and the objects thereof, attention is directed to the drawing, the following brief description thereof, to the detailed description of the preferred embodiment, and to the appended claims.

DETAILED DESCRIPTION OF THE PREFERRED EMBODIMENT

Figure 1:
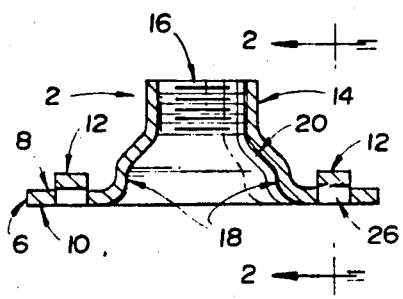
FIG. 1 is a sectional view, taken along lines 1—1 of FIG. 2, of a first embodiment of a fastener constructed in accordance with the present invention.
Figure 2:
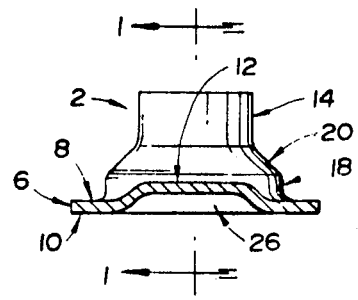
FIG. 2 is a sectional view taken along lines 2—2 of FIG. 1 of the fastener.

Referring to FIGS. 1 through 6 and FIGS. 11 and 12, it will be seen that each of the fasteners designated generally at 2, 4 and 5 has a base 6 with a top surface 8 and a bottom surface 10. The base 6 has upwardly extending, spaced clinch members 12 and a tubular portion 14 therebetween.

The tubular portion 14 has a threaded region 16 for engaging bolts or screws. The tubular portion 14 of each of the fasteners 2 and 5 has a neck region 18 of a substantially constant diameter which extends upwardly from the base 6 to a taper region 20.

Figure 6:
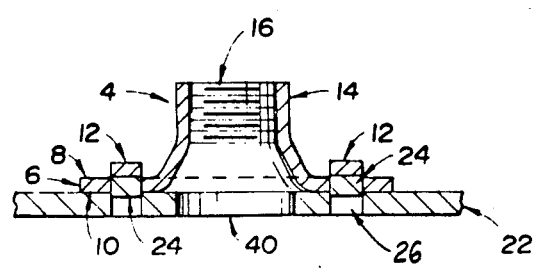
FIG. 6 is a sectional view of the fastener of FIGS. 4 and 5, taken along lines 6—6 of FIG. 5, attached to sheet material.
Figure 13:
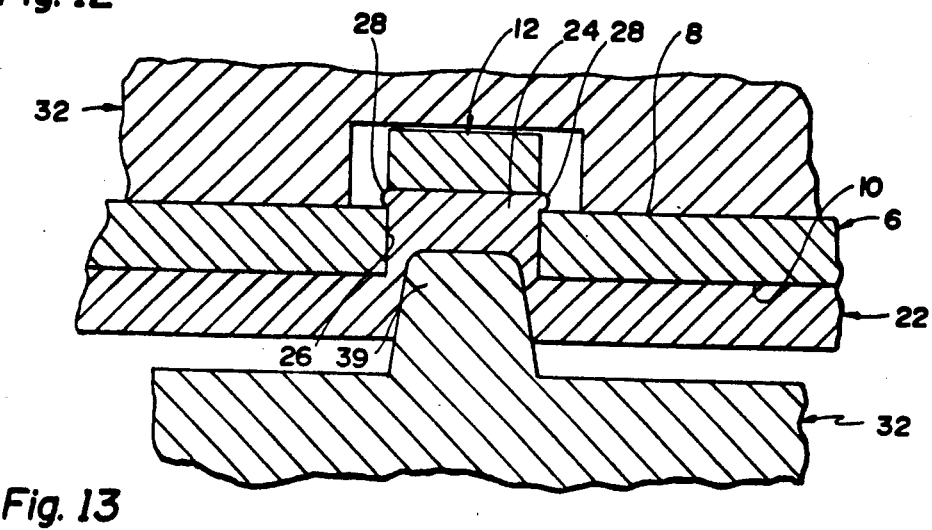
FIG. 13 is an enlarged, partially broken away, sectional view of sheet material and the fastener of FIGS. 11 and 12 in a die after compression to effect attachment of the fastener to the sheet material.

To attach each of the fasteners 2, 4 and 5 to the sheet material 22, portions 24 of the sheet material 22 are forced into clinch member openings 26, as shown in FIG. 6. As the portions 24 of the sheet material 22 continue to be forced into the clinch member openings 26 they contact the underside of the clinch members 12. Continued pressure on the portions 24 of sheet material 22 causes the portions 24 to be extruded through the clinch members 12 at extrusion points 28. These extrusions effect an attachment of each of the fasteners 2, 4 and 5 to the sheet material 22. As shown in FIG. 13, the extrusion is accomplished without perforating or severing the sheet material 22.

Figure 9:
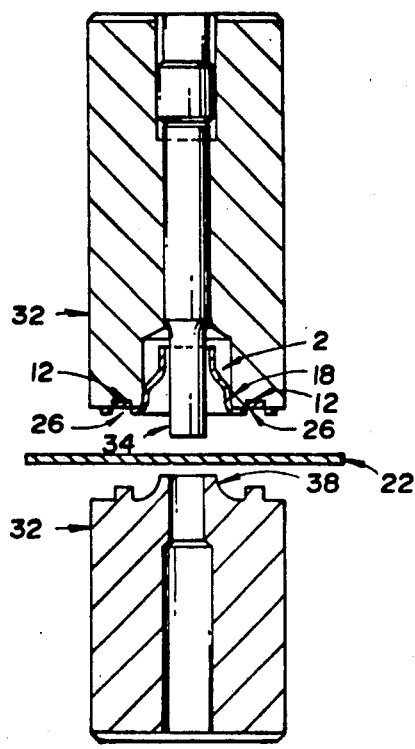
FIG. 9 is a sectional view of a fastener according to FIGS. 1 and 2 and sheet material positioned in a die in preparation for attachment.
Figure 10:
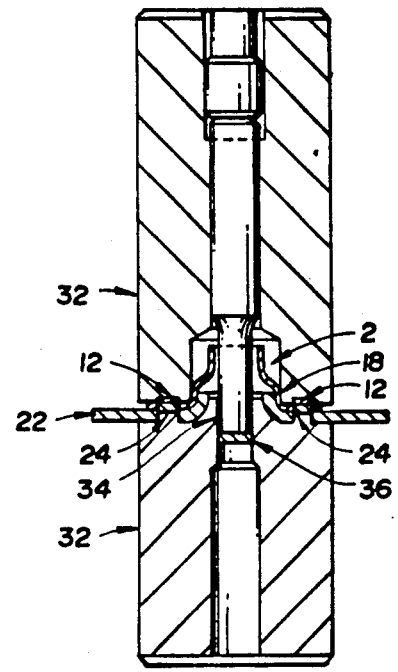
FIG. 10 is a sectional view of the fastener of FIGS. 1, 2, and 9 and the sheet material in the die after compression to effect attachment of the fastener to the sheet material.

FIGS. 9 and 10 show a method of attaching each of the fasteners 2, 4 and 5 with neck regions 18 to the sheet material 22 while forming bolt holes in a single operation. One of the fasteners is placed with the sheet material 22 in a die 32 as shown in FIG. 9. Then the die 32 is compressed as shown in FIG. 10. Compression of the die 32 first causes a bore punch 34 of the die 32 to punch out a slug 36 of sheet material. As the die 32 is further compressed, the sheet material 22 in the area of the hole left by the slug 36 is pressed against the surface of the neck region 18 by a die ring 38 of the die 32. At the same time, the sheet material portions 24 are simultaneously extruded through the clinch members 12. The area of the hole left by the slug 36 has a center axis which lies on the longitudinal central axis of the tubular portion 14 which, in the orientation shown in FIGS. 9 and 10, extends vertically.

Preferably, the portions 24 of the sheet material are extruded through the clinch members 12 by trapezoidal-shaped extrusion members 39 (only one of which is shown) formed on the die 32, as best shown in FIG. 13.

Figure 3:
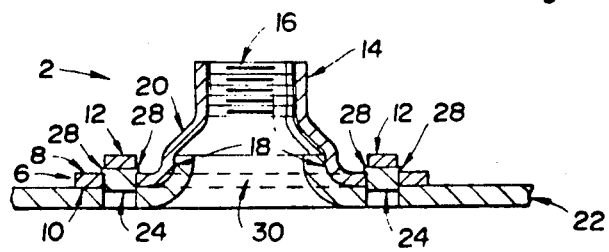
FIG. 3 is a sectional view of the fastener of FIGS. 1 and 2 attached to sheet material.
Figure 4:
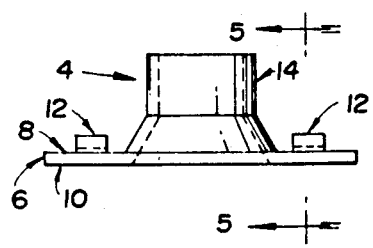
FIG. 4 is a side elevational view of a second embodiment of a fastener constructed in accordance with the present invention.
Figure 5:
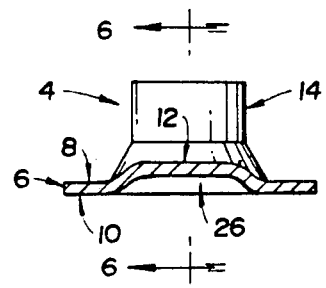
FIG. 5 is a sectional view taken along lines 5—5 of the fastener of FIG. 4.
Figure 12:
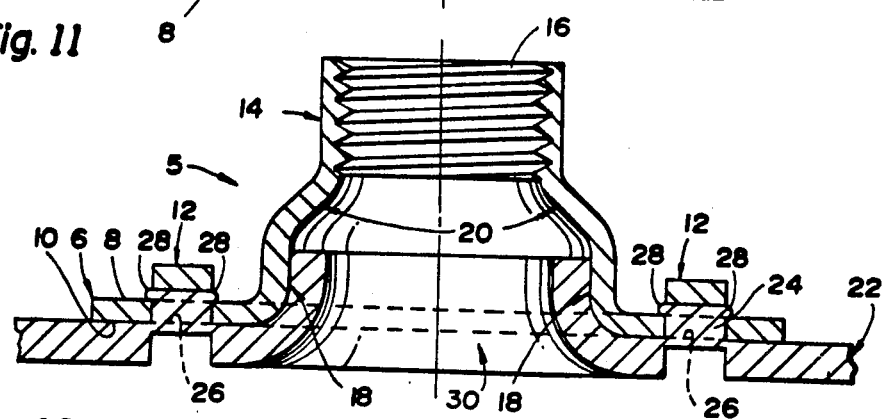
FIG. 12 is a sectional view of the fastener and attached sheet material of FIG. 11.

The resulting configuration of the attached fastener 2 and sheet material 22 is shown in FIG. 3. The resulting configuration of the attached fastener 5 and the sheet material 22 is shown in FIG. 12. The benefits of these configurations are twofold. First, pressing the sheet material 22 against the surface of the neck region 18 forms a tight seal between each of the fasteners 2 and 5 and the sheet material 22. Second, the diameter of each of the bolt holes 30 is larger than the major diameter of its threaded region 16, making the use of thread-cutting bolts with the fasteners unnecessary.

When attaching the fastener 4 to the sheet material 22, the use of thread-cutting bolts is obviated by making a preformed bolt hole 40 in the sheet material 22 prior to attachment of the fastener 4. The bolt hole 40 of the fastener 4 has a larger diameter than the major diameter of the threaded region 16.

In practice, each of the fasteners 2, 4 and 5 may be made out of an annealed 1050 steel. After making each of the fasteners 2, 4 and 5, they may be heat-treated to a Rockwell hardness of 46 to 48 to increase their strength.

Figure 7:
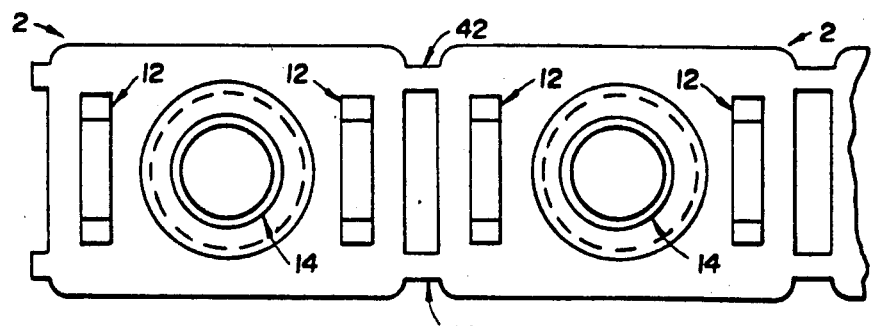
FIG. 7 is a top view of a multiplicity of fasteners according to FIGS. 1 and 2, connected together in a strip.
Figure 8:
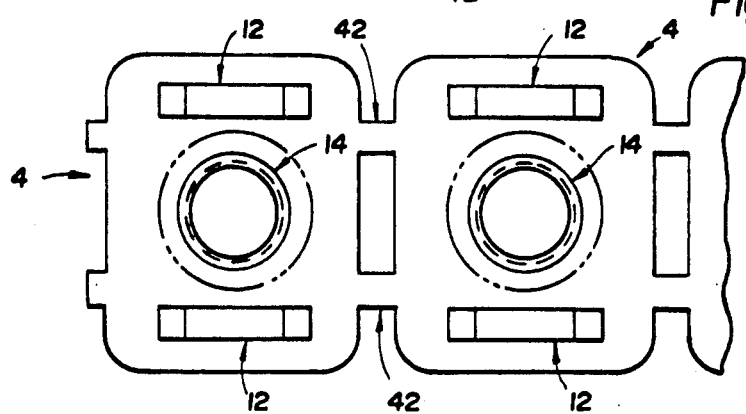
FIG. 8 is a top view of a multiplicity of fasteners according to FIGS. 4 and 5 connected together in a strip.
Figure 11:
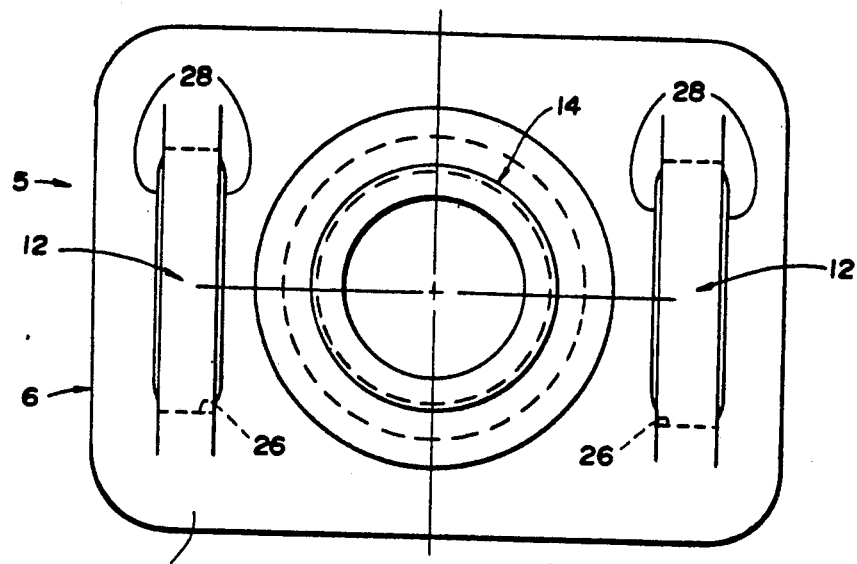
FIG. 11 is a top plan view of a third embodiment of the fastener according to the present invention attached to sheet material.

Referring to FIGS. 7, 8 and 11, the relatively large surface area of the base 6 of each of the fasteners 2, 4 and 5 is shown. This feature increases the strength of the fasteners 2, 4 and 5 in actual use by providing a large load bearing area for abutment against the sheet material 22.

Also, as shown in FIGS. 7 and 8, in reference to the fasteners 2 and 4, connecting members 42 may be used to join the fasteners to one another in strips. The strips of fasteners, for example, the strips of fasteners 2 and 4, may be fed into an automated assembly unit from a dispenser, such as a spool feeder.

Figure 15:
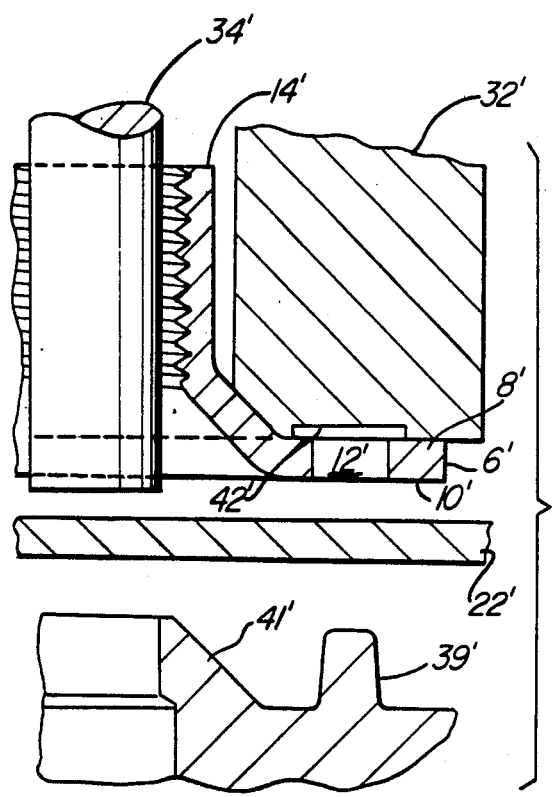
FIG. 15 is an enlarged fragmentary sectional view of a fastener according to FIG. 14 and sheet material positioned in a die in preparation for attachment.
Figure 16:
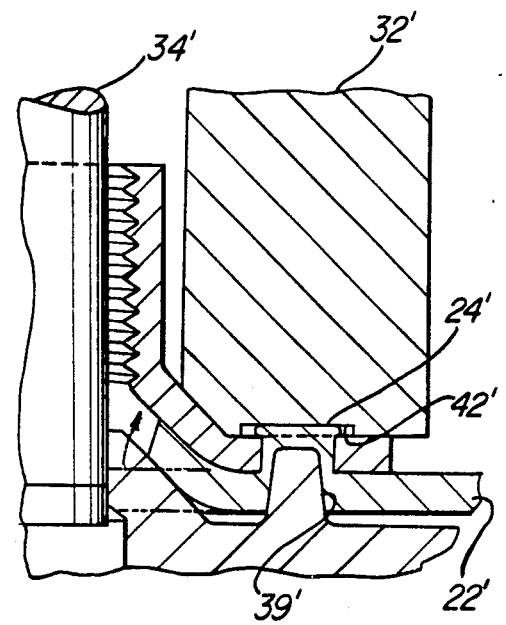
FIG. 16 is a view similar to FIG. 14 of the fastener of FIG. 14 and the sheet material in the die after compression to effect attachment of the fastener to the sheet material.
Figure 14:
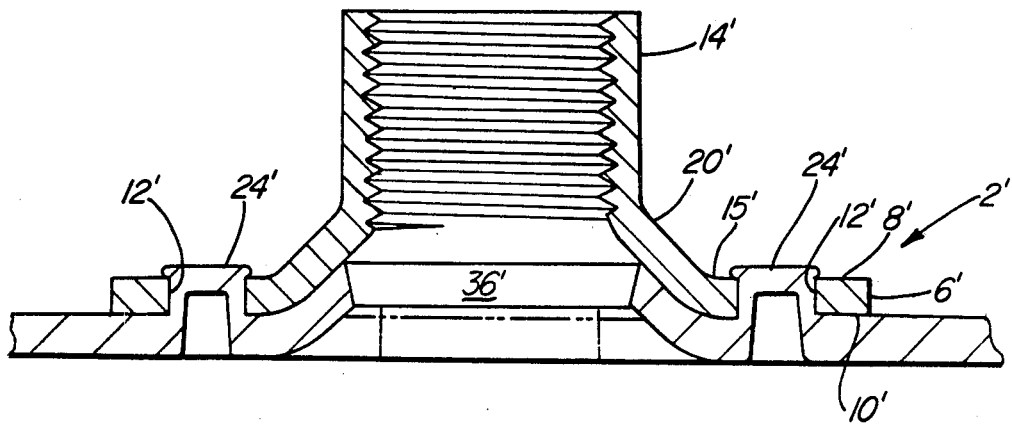
FIG. 14 is a view, similar to FIG. 12, of a fourth and the preferred embodiment of the fastener according to the present invention attached to sheet material.

Referring now to the embodiment of the invention shown in FIGS. 14 through 16, there is shown a fastener 2' that has a base 6' with a top surface 8' and a bottom surface 10'. The base 6' has spaced clinch openings 12' therein and an internally threaded tubular portion 14' between the clinch openings 12'. The tubular portion 14' of the fastener 2' is positioned above a planar portion 15' of the fastener 2' that contains the clinch openings 12' and is connected to such planar portion 15' by a taper region 20' that extends outwardly and downwardly from the tubular portion 14' to the planar portion 15'.

The fastener 2' is attached to a drawable sheet material 22', such as annealed steel, by forcing portions of the sheet material 22' through the clinch openings 12' in a die 32'. The die 32' is compressed, as is shown in FIG. 16, to cause a bore punch 34' of the die 32' to punch out a slug from the sheet material, leaving a hole 36' therein and to cause portions 24' of the sheet material to be extruded through the clinch openings 12' of the fastener 2' by the operation of trapezoidal-shaped extrusion members 39', only one of which is shown, into die cavities 42', only one of which is shown. Each of the die cavities 42' bears against the top surface 8' of the fastener 2', during the extrusion step, and each of such cavities 42' is aligned with, and is somewhat larger than one of such clinch openings 12' during the die compression step. Thus, when the extrusion members 39' extrude the portions 24' of the sheet material 22' through the clinch openings 12' into the die cavities 42', the portions 24' will expand within the die cavities 42' beyond the edges of the clinch openings 12', thereby securing the fastener 2' to the sheet material 22' without forming any discontinuity in the sheet material 22' that could permit liquid seepage therethrough and possible corrosion as a result thereof.

The die 32' also has a frustoconical portion 41' that is axially aligned with the tubular portion 14' of the fastener 2'. In the die pressing operation, the frustoconical portion 41' of the die 32' deflects the portion of the sheet material that surrounds the hole 36' upwardly against the underside of the taper region 20' of the fastener 2' in surface to surface engagement therewith. This increases the inside diameter of the hole 36' beyond the outside diameter of the bore punch 34' that was used to form it, thereby eliminating the need for an additional piercing or other machining operation to increase the diameter of the hole 36' as might otherwise be required to permit it to receive a threaded fastener that is to be attached to the fastener 2'. Further, the surface to surface contact between the portion of the sheet material 22' that surrounds the hole 36' and the underside of the taper region 20' of the fastener 2' reinforces the fastener against compression loads applied to the fastener 2' in a direction parallel to the longitudinal axis of the tubular portion, thereby increasing the resistance of the fastener 2' to collapsing under such compression loads.

The fastener 2' like the fasteners 2, 4 and 5, is preferably formed out of annealed steel, such as A.S.E. 1050 steel, and the fastener 2' is also preferably heat-treated after its manufacture to increase its hardness to a hardness of 46 to 48 on the Rockwell "C" scale. Like the fasteners 2, 4 and 5, the fastener 2' also has a base 6' with a relatively large surface area to provide for a large load bearing area against the sheet material 22'.

The above constitutes a detailed description of the best mode contemplated at the time of filing for carrying out the present invention. It will be apparent to those skilled in the art that many variations and modifications may be made from the above described examples without departing from the spirit of the present invention. Such variations and modifications are included within the intended scope of the claims appended hereto.

What is claimed is:

1. A method for attaching at least one fastener to sheet material, said fastener including a base portion having top and bottom surfaces, said base portion including a pair of spaced clinch members integrally formed therewith to define a pair of spaced clinch openings in said bottom surface of said base member and a pair of spaced extrusion openings in said top surface in fluid communication with said clinch openings, said fastener further including a tubular attachment portion integrally formed with said base portion between said clinch members and adapted for attachment to a separate fastener, said method comprising the steps of:
   placing said fastener on said sheet material so that said bottom surface of said base portion abuts said sheet material;
   punching out a slug of sheet material to leave a hole in said sheet material, said hole having its center on a line forming a longitudinal axis of said tubular attachment portion; and
   extruding portions of said sheet material surrounding said hole into said clinch openings and through said extrusion openings substantially simultaneously with said steps of punching to effect an attachment of said fastener to said sheet material at said top surface of said base portion without severing said portions of sheet material.

2. A method as claimed in claim 1 including the step of flanging second portions of said sheet material immediately surrounding said hole so that said second portions abut the inner surface of said tubular attachment portion.

3. A method as claimed in claim 2 wherein said steps of punching, extruding and flanging are performed substantially simultaneously.

4. A method as claimed in claim 1 wherein a strip of the fasteners is attached to sheet material and wherein said method further includes the step of feeding said fasteners so that said fasteners are consecutively positioned immediately adjacent said sheet material.

5. A method for attaching at least one fastener to sheet material, said fastener including a base portion having top and bottom surfaces, said base portion including a pair of spaced clinch members integrally formed therewith to define a pair of spaced clinch openings in said bottom surface of said base portion and a pair of spaced extrusion openings in said top surface in fluid communication with said clinch openings, said fastener further including a tubular attachment portion integrally formed with said base portion between said clinch members and adapted for attachment to a separate fastener, the method comprising the steps of:
   placing said fastener on said sheet material so that said bottom surface of said base portion abuts said sheet material;
   punching out a slug of sheet material to leave a hole in said sheet material, said hole having its center on a line forming a longitudinal axis of said tubular attachment portion;
   extruding portions of said sheet material surrounding said hole into said clinch openings and through said extrusion openings to effect an attachment of said fastener to said sheet material at said top surface of said base portion without severing said portions of sheet material; and
   flanging second portions of said sheet material immediately surrounding said hole so that said second portions abut said inner surface of said tubular attachment portion.

6. A method for attaching a fastener to drawable sheet material having opposed surfaces, said fastener including a base portion having top and bottom surfaces, a neck portion and a portion connecting said neck portion to said base portion, said base portion including at least one clinch opening having an edge therein, said method comprising the steps of:
   placing said fastener on said sheet material so that said bottom surface of said base portion abuts one of said opposed surfaces of said sheet material;
   bringing a die having a cavity into contact with said top surface of said base portion of said fastener, said cavity being aligned with said at least one clinch opening and being at least slightly larger than said at least one clinch opening; and
   extruding a portion of said base portion of said drawable sheet material through said at least one clinch opening into said cavity to cause said portion of said base portion of said drawable sheet material to expand beyond said edge of said at least one clinch opening and to thereby secure said fastener to said drawable sheet material, said extruding being accomplished without any severing of said portion of said base portion of said drawable sheet material.

7. A method according to claim 6 wherein said step of extruding a portion of said base portion of said drawable sheet material through said at least one clinch opening is accomplished by bringing an extrusion member against the other of said opposed surfaces of said sheet material in alignment with said cavity of said die.

8. A method according to claim 6 and further comprising the step of:
   punching out a slug of sheet material to leave a hole in said base portion of said sheet material, said hole having its center on a line forming a longitudinal axis of said neck portion.

9. A method according to claim 8 wherein said portion connecting said neck portion to said base portion of said fastener is a tapered portion, said method further comprising the step of:
   deforming a portion of said base portion of said sheet material around said hole to form surface to surface contact between said portion of said base portion and said tapered portion of said fastener to increase the inside dimension of said hole, to help form a seal between said fastener and said sheet material and to increase the resistance of said fastener to collapsing under compressive loads extending parallel to said longitudinal axis of said neck portion.

10. A method of attaching a fastener to drawable sheet material having opposed surfaces, said fastener including a base portion having top and bottom surfaces, a neck portion and a portion connecting said neck portion to said base portion, said base portion including first and second clinch openings, each of which has an edge, said neck portion being disposed between said first and second clinch openings, said method comprising the steps of:

placing said fastener on said sheet material so that said bottom surface of said base portion abuts one of said opposed surfaces of said sheet material;

bringing a die having first and second cavities into contact with said top surface of said base portion of said fastener, said first cavity being aligned with said first clinch opening and being at least slightly larger than said first cavity, said second cavity being aligned with said second clinch opening and being at least slightly larger than said second clinch opening; and extruding first and second portions of said base portion of said drawable sheet material, respectively, through said first and second clinch openings into said first and second cavities of said die to cause said first and second portions of said base portion to expand beyond the edges of said first and second clinch openings, respectively, and to thereby secure said fastener to said drawable sheet material at the locations of said first and second clinch openings of said fastener, said extruding being accomplished without any severing of said first and second portions of said base portion of said drawable sheet material.

11. A method according to claim 10 wherein said step of extruding said first and second portions of said base portion of said drawable sheet material, respectively, through said first and second clinch openings is accomplished by bringing first and second extrusion members against the other of said opposed surfaces of said sheet material in alignment, respectively, with said first and second cavities of said die.

12. A method according to claim 10 and further comprising the step of:

punching out a slug of sheet material to leave a hole in said base portion of said sheet material, said hole having its center on a line forming a longitudinal axis of said neck portion.

13. A method according to claim 12 wherein said portion connecting said neck portion to said base portion of said fastener is a tapered portion.

14. A product produced by the method of claim 10.
15. A product produced by the method of claim 11.
16. A product produced by the method of claim 12.
17. A product produced by the method of claim 13.

* * * * *